United States Patent [19]

Mangiarotty

[11] Patent Number: 4,802,642

[45] Date of Patent: Feb. 7, 1989

[54] CONTROL OF LAMINAR FLOW IN FLUIDS BY MEANS OF ACOUSTIC ENERGY

[75] Inventor: Rudolph A. Mangiarotty, Seattle, Wash.

[73] Assignee: The Boeing Company, Seattle, Wash.

[21] Appl. No.: 918,229

[22] Filed: Oct. 14, 1986

[51] Int. Cl.$^4$ .............................................. B64C 23/00
[52] U.S. Cl. .................................. 244/200; 244/204; 244/130
[58] Field of Search .............. 244/200, 198, 201, 204, 244/130, 209; 114/67 R, 67 A; 138/40

[56] References Cited

U.S. PATENT DOCUMENTS

| | | | |
|---|---|---|---|
| 2,783,008 | 2/1957 | Bodine, Jr. | 244/130 |
| 3,117,751 | 1/1964 | Rogers et al. | 244/209 |
| 3,774,867 | 11/1973 | Quinn | 244/130 |
| 4,516,747 | 5/1985 | Lurz | 244/130 |
| 4,693,201 | 9/1987 | Williams et al. | 244/130 |

Primary Examiner—Galen Barefoot
Attorney, Agent, or Firm—James P. Hamley; B. A. Donahue

[57] ABSTRACT

Retarding of the point of transition from laminar flow to turbulent flow in aerodynamic boundary layers on the surfaces of aircraft is accomplished by radiating acoustic energy at frequencies greater than twice the critical Tollmein-Schlichting frequency into the boundary layer. The acoustic energy interferes with the formation of Tollmein-Schlichting waves, thereby increasing the incidence of laminar flow and reducing aerodynamic drag.

11 Claims, 3 Drawing Sheets

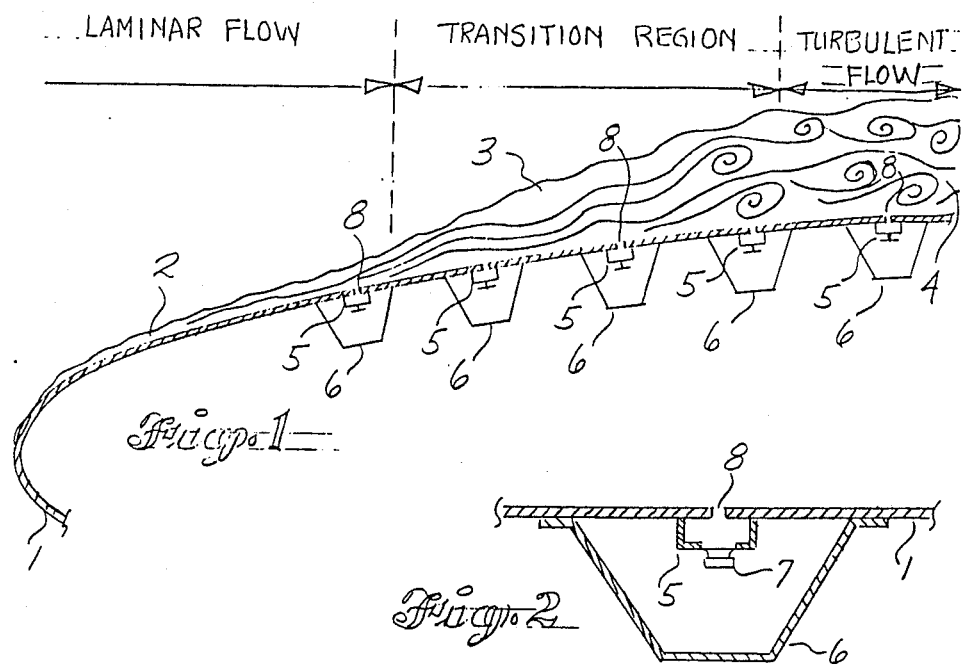
Fig. 1
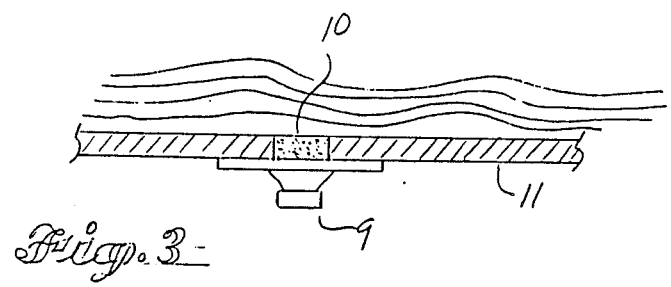
Fig. 2
Fig. 3
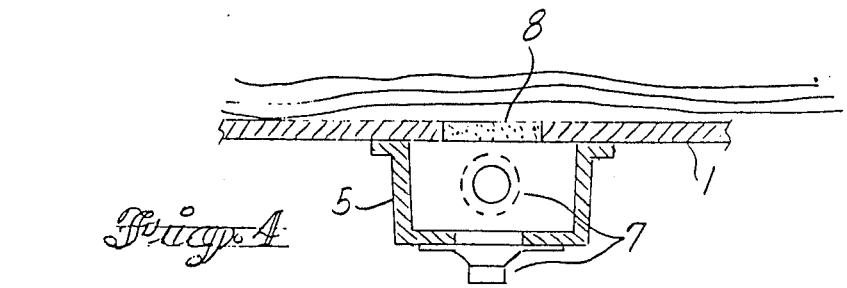
Fig. 4

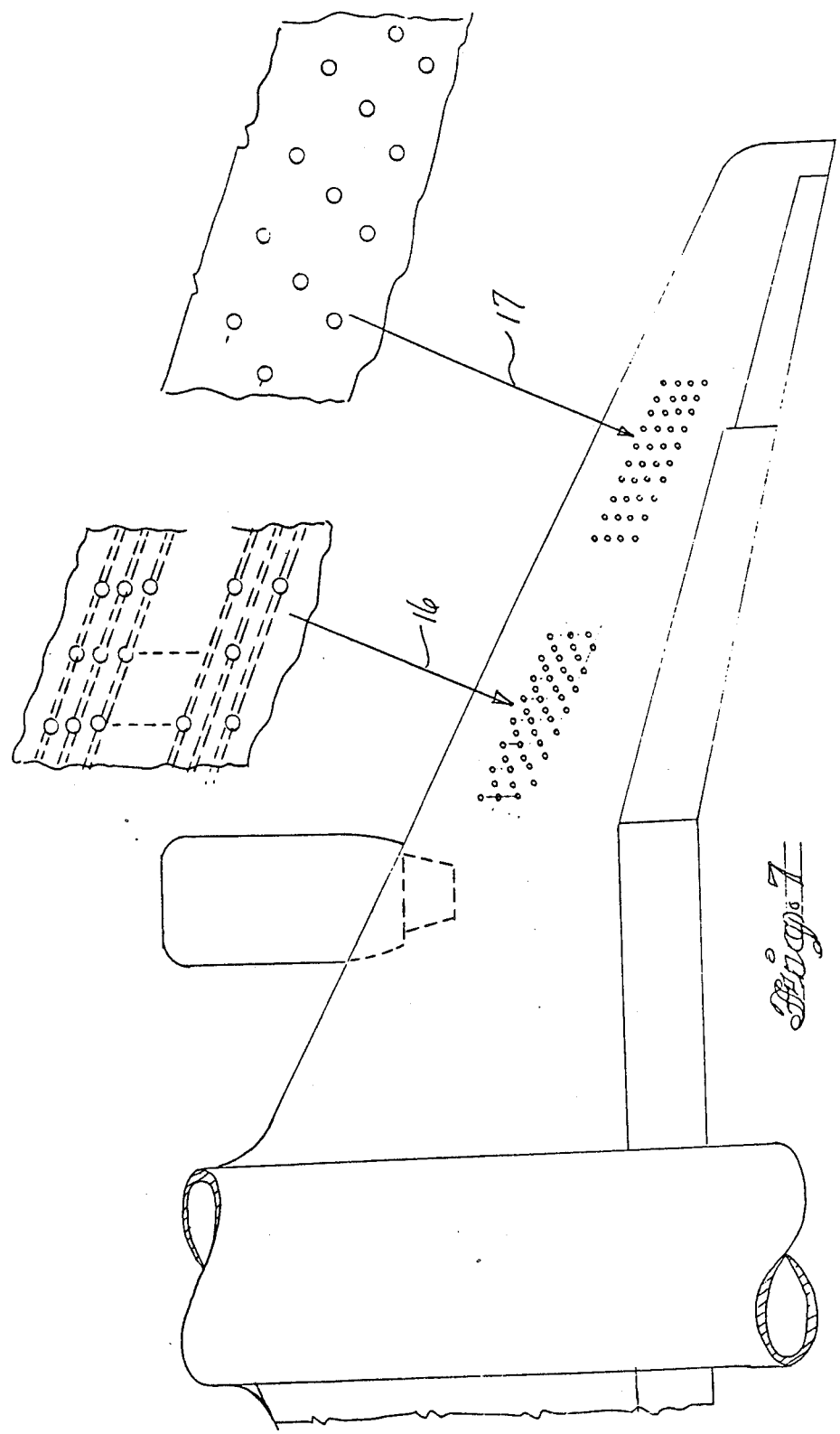

CONTROL OF LAMINAR FLOW IN FLUIDS BY MEANS OF ACOUSTIC ENERGY

FIELD OF THE INVENTION

This invention relates to the field of aerodynamics having to do with the use of acoustic energy, alone or in combination with traditional methods, for controlling the characteristics of the boundary layer that forms upon an airfoil moving with respect to a surrounding fluid.

DESCRIPTION OF THE PROBLEM

Because air is viscous any object moving through it collects a group of air particles which it pulls along with it. A particle directly adjacent to the surface of the object will be pulled along at approximately the speed of the object due to viscous adhesion. As an airfoil moves through a free stream of air at a given velocity, this effect causes a very thin layer of air having velocities below that of the free stream velocity, to form upon the airfoil surface. This layer, known as the "boundary layer", constitutes the interface between the airfoil and its surrounding air mass. Conceptually, the boundary layer may be thought of as the layer of air surrounding an airfoil in which the velocity of the layer of molecules closest to the airfoil is at or near zero with respect to the airfoil, and in which the velocity at successively distant points from the airfoil increases until it approaches that of the free stream, at which point the outer limit of the boundary layer is reached. Generally, boundary layers may be thought of as being one of two types, laminar or turbulent, although there is a region of transition between laminar and turbulent that may, in some cases, be quite large. A third condition, in which the boundary layer is "unattached", must also be recognized. A laminar boundary layer is typified by smooth flow that is free from eddies. Conversely, turbulent flow is characterized by a thicker boundary layer that has a large number of eddies that act to transfer momentum from the faster moving outer portions to the relatively slower portions nearer the airfoil surface. Consequently, a turbulent boundary layer has a greater average velocity near the airfoil surface, and a correspondingly greater amount of surface friction, than does a laminar boundary layer. The increase in surface friction causes increased aerodynamic drag that requires greater power consumption to maintain constant airfoil speed.

Typically, a laminar boundary layer will form at or near the leading edge of a conventional airfoil and extend rearward toward the points of minimum pressure on the upper and lower surfaces. According to Bernoulli's principle, the region between the leading edge and the first minimum pressure point is one of a decreasing pressure gradient. Thereafter, the pressure gradient will increase and the relatively low kinetic energy of the air molecules closest to the airfoil surface may be insufficient to maintain laminar flow against the gradient. In this event it is possible that small perturbations in the boundary layer will develop into eddies that initiate a transition from laminar to turbulent flow. Alternatively, in the presence of higher pressure gradients, the molecules closest to the airfoil surface may actually reverse their direction of motion and begin to move upstream, thereby causing the boundary layer to separate from the airfoil surface. This condition causes significantly more drag, and less lift, than a tubulent boundary layer, and reattachment will not normally occur unless some means is employed to reenergize the boundary layer. The problem, then, is to develop means to control the boundary layer of an airfoil in order to reduce aerodynamic drag and the energy losses associated therewith.

Prevention of the transition from laminar flow to turbulent flow in aerodynamic boundary layers on the surfaces of aircraft and aerospace vehicles is an important method for reducing aerodynamic drag, and hence reducing energy consumption. The invention herein utilizes acoustic energy to increase the incidence of laminar flow. This may be accomplished by a combination of methods and apparatus designed to eliminate separation of the boundary layer from the airfoil, and to forestall or retard the point at which the transition from laminar to turbulent flow commences. The use of acoustical methods for total or local control of laminar flow is potentially more economical in energy consumption than use of other currently available methods, and also involves simpler and lighter installations than are required for other systems. Acoustic laminar flow control may be used in conjunction with other existing or available systems, and the combination of methods may provide benefits over a wider range of flight conditions and is considered to be an embodiment of the invention.

BACKGROUND OF THE INVENTION

A number of devices of varying effectiveness and utility have been proposed to mitigate the effects of boundary layer separation or laminar-to-turbulent transition. These devices have generally employed mechanical means and have been directed to reenergizing a stagnant boundary layer. Such devices include wing vortex generators, wing leading and trailing edge slats and slots, boundary layer air suction mechanisms, and boundary layer air blowers.

Fixed vortex generators were employed on the upper surfaces of the swept wings of early jet transports to create controlled vortices that would reenergize and narrow the stagnant boundary layer that developed near the trailing edge, thereby preventing boundary layer separation from the wing. Although the reattached boundary layer was turbulent, it was preferable to separation and required no additional energy input to function. Another partial solution to the problem employed various forms of blowers designed to reenergize and maintain laminar flow by injecting high energy jets of smooth laminar air at critical regions upon the aerodynamic surface whose boundary layer was to be controlled. Disadvantages to this method included weight penalties due to necessary air ducting and engine power loss associated with the use of compressor bleed air to produce high energy air jets. Where independent pumps were used to create the high energy air jets, additional penalties of weight and complexity were encountered. A third approach involves the removal of low energy boundary layer air through suction slots or porous surfaces on the airfoil. Most of the work in laminar flow control has concentrated on the use of fluid suction to remove the boundary layer through slots in the surface of an aircraft wing. As the stagnant layer is removed from the surface of the airfoil, it is replaced by higher energy air from higher levels in the boundary layer. Fluid suction systems, as with blower systems, suffer the drawbacks of being complex, relatively heavy, and not particularly energy efficient. In addition, the requirements for internal airfoil ducting and air pumps may prohibit the use of blower or suction systems on some aerodynamic members for which boundary layer control might otherwise be desirable. Slotted leading edge slats and slotted trailing edge flaps utilize aerodynamic pressure to reenergize stagnant boundary layers, and are widely used in high lift airfoil configurations such as landing or takeoff. As these devices are primarily associated with temporary airfoil reconfigurations of limited duration, their suitability for high altitude, high speed cruise conditions of long duration is marginal.

SUMMARY OF THE INVENTION

The invention comprises a method of retarding the onset of turbulence in the boundary layer of an airfoil moving with respect to an air mass by electronically generating acoustic energy at or near the surface of an airfoil having a laminar flow boundary layer over at least a portion of its surface, and directing the acoustic energy into the boundary layer from a number of locations upon the airfoil surface over which the boundary layer flow is laminar.

BRIEF DESCRIPTION OF THE DRAWINGS

FIG. 1 is a typical airfoil section configured for boundary layer control showing laminar flow, transition, and turbulent boundary layers.

FIG. 2 is an enlarged view of a ducting arrangement and transducer.

FIG. 3 illustrates a transducer mounting on a nonducted airfoil surface.

FIG. 4 shows a close-up view of transducer mountings within a tributary duct.

FIG. 7 illustrates preferred acoustic transducer configurations upon a typical aircraft wing.

DETAILED DESCRIPTION OF THE DRAWINGS

Figure 5:
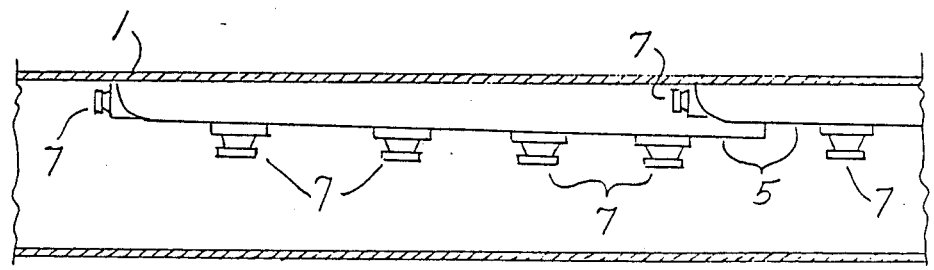
FIG. 5 depicts a transducer mounting arrangement within a spanwise duct.

FIG. 1 illustrates a typical lifting aerodynamic surface 1 requiring a laminar flow boundary layer. Thin laminar boundary layer flow is observed in region 2 from the leading edge to a point at which transition begins. The beginning of the transition region 3 is characterized by a thickening of the boundary layer and the appearance of small eddying perturbations in airstream velocity. As the airstream progresses through the transition region, certain airflow disturbances within a range of predictable oscillatory frequencies, known as Tollmien-Schlichting waves, become amplified to form eddies that cause a transfer of momentum from the higher energy air near the outer surface of the boundary layer to the low energy air at the surface. At this point the airstream enters region 4 and becomes turbulent, being comprised of many large eddies and characterized by a relatively higher average velocity near the airfoil surface. The higher velocity creates greater surface friction with the airfoil which is evidenced as an increase in aerodynamic drag.

Acoustical Properties of Boundary Layer Flow

Mathematical analyses done by W. Tollmien in the early 1930s resulted in the publication of a theory of the stability of laminar motion in the boundary layer near a thin flat plate in an airstream flowing parallel to the plate. The calculations were repeated and extended by H. Schlichting in 1933 and 1935, and were confirmed experimentally in 1941 by Schubauer and Skramstad. The theory predicted that a range of small disturbances or perturbations in the velocity of a laminar airstream would, in mathematically identifiable regions, take on an oscillatory motion, or mode, that would become amplified until laminar flow was broken down. Disturbances occurring outside such identifiable regions would become damped. The regions in which amplification occurred were defined as a function of Blasius velocity distribution and Reynolds number, and experimental data conformed closely to the mathematically predicted phenomena. Schubauer and Skramstad's experimental data also confirmed that the frequency of the amplified oscillations, known as Tollmien-Schlichting, or T-S, waves, fell within a relatively narrow frequency bandwidth.

In experiments conducted jointly by The Boeing Company and the National Aeronautics and Space Administration in late 1985, T-S mode frequencies were calculated for the wing boundary layers for a Boeing 757-200 commercial transport. These predicted T-S frequencies were then confirmed experimentally from flight test data measured with hot film sensors on the surfaces of the airplane wing. The predicted and experimentally verified T-S frequencies were in the range of 100 to 6000 Hz, varying as predicted with wing location, flight altitude, and aircraft speed.

Other research has confirmed that Tollmien-Schlichting waves are responsive to external acoustical excitation. The application of acoustic energy having frequencies within the range of the characteristic critical wavelengths of T-S waves has been shown to enhance the amplification of T-S waves. It has also been found that external acoustic excitation of a laminar boundary layer within a frequency band slightly wider than the T-S waves in the laminar flow to be controlled causes a delay in the amplification process of T-S waves. This occurs when the wavelengths of the acoustic disturbances are in the same range as the T-S wavelengths and interact with the T-S waves in a time-phase relationship to delay amplification of disturbances in the laminar flow.

A third regime in which T-S waves are affected by external acoustic excitation is found at frequencies substantially higher than the T-S wave critical frequencies, that is, at wavelengths substantially shorter than the T-S critical wavelengths. In this case, acoustic disturbances impinging on the laminar flow interfere destructively with the growing T-S waves. Acousting excitation sufficient to destructively interfere with T-S waves must contain frequencies at least twice as high as the highest of the T-S critical frequencies. It is within this third regime that the invention herein finds its preferred embodiment.

The airfoil shown in FIG. 1 illustrates the use of acoustic transducers in conjunction with a fluid suction boundary layer control system. Spanwise ducts 6 installed upon the underside of the upper aerodynamic surface 1 are continuously evacuated through a suction pump or vacuum chamber. The reduced pressure in the spanwise ducts causes pressure gradients through tributary ducts 5 which are vented to the boundary layer through slots or porous elements. The detail of this configuration is expanded in FIG. 2.

As shown in FIG. 2, within each spanwise duct is a tributary duct 5 mounted so as to enclose a slot or porous element 8 through the airfoil skin. The slot is situated so as to evacuate low energy air from the boundary layer into the tributary duct. The walls of the tributary duct contain small perforations through which the evacuated air may pass into the lower pressure spanwise duct. An acoustic transducer 7 is mounted directly to the tributary duct so as to emit acoustic energy directly into the duct. Acoustic energy is thereby transmitted through the slot or perforation 8 and impinges upon the boundary layer at that point, destructively interfering with incipient T-S waves. This combination type of installation is particularly well suited for larger aerodynamic surfaces in which fluid suction is practicable. It can be seen that each method of controlling the boundary layer can be operated independently of the other, and that the simultaneous use of both systems is permissible, with correspondingly greater influence over the boundary layer.

FIG. 3 depicts an alternative configuration in which acoustic energy is the sole means of controlling the boundary layer at the point of mounting. Acoustic transducer 9 is mounted directly to the underside of the airfoil skin 11 and radiates its acoustic energy directly into the boundary layer through porous or perforated surface 10. This type of mounting is most suitable for controlling the boundary layer upon aerodynamic surfaces that are very small, thin, or are remote from a suitable suction pump or other evacuation device. It may also be used upon larger surfaces where the need for supplementary boundary layer control is minimal.

FIG. 4 demonstrates a mounting configuration in which acoustic transducers are used in conjunction with a suction device. Acoustic transducers 7 are mounted at the bottom and at the far end of tributary duct 5. The tributary duct serves both to evacuate de-energized boundary layer air when the suction system is operative, and to provide acoustic diffusion for the plurality of transducers mounted upon the duct.

FIG. 5 shows the location of tributary ducts 5 and acoustic transducers 7 within a spanwise duct. The spanwise duct is mounted to the underside of the airfoil surface 1. In the preferred embodiment for this configuration, placement of the acoustic transducers within and upstream of the transition region of the boundary layer is normally sufficient to prevent the formation of T-S waves. Precise placement of the transducers with respect to one another is unnecessary, as the high frequencies energizing them generate short enough wavelengths, with respect to the diameters of the acoustic radiators, that acoustic interference and cancellation of transducer frequencies will be negligible or nonexistent. For similar reasons, the precise placement of porous elements or slots 8 (shown in FIGS. 2, 4, and 7) with respect to one another on the airfoil surface will not be critical so long as acoustic wavelengths are short enough, with respect to the size of the porous elements or slots, to eliminate interference and cancellation effects. Assisting in the elimination of these effects is the fact that acoustic energy emitting into tributary ducts mixes and diffuses before it is emitted through the porous elements or slots.

Figure 6:
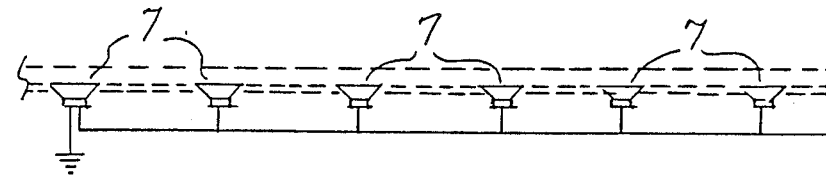
FIG. 6 is a schematic diagram showing an electrical wiring scheme for the preferred embodiment.
Figure 6:
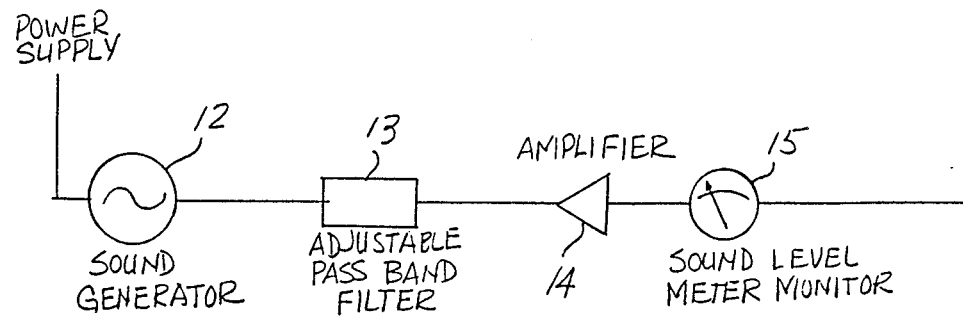

FIG. 6 is a schematic wiring diagram depicting a typical wiring configuration for a plurality of acoustic transducers. A suitable sound generator 12 produces a broad spectrum of frequencies that are passed through adjustable pass band filter 13 to produce a narrower range of desired frequencies. This signal is amplified at amplifier 14, measured with sound level meter monitor 15, and sent to acoustic transducers 7. The specific range of desired frequencies is dependent upon a number of variable factors including airfoil shape, air density, airstream velocity, and the like. In general, however, it is sufficient that the frequencies produced by acoustic transducers be at least twice as high as the T-S wave frequencies or, stated another way, have wavelengths less than half the length of the T-S wavelengths.

FIG. 7 is a plan view of a typical swept wing showing the placement of acoustic transducer arrays both with (at location 16) and without (at location 17) supplemental boundary layer control. Although the disadvantages of extra weight and complexity associated with suction boundary layer control have generally been believed to outweigh the benefits of decreased aerodynamic drag through the enlargement of the area of laminar boundary flow, a combination of suction and acoustic methods may, in certain design configurations, provide energy savings sufficient to recommend the use of such combinations. In those cases, suitable combinations could include a few rows of flat transducer mountings under the airfoil skin slightly upstream from the area of boundary layer transition, followed by a few rows of a combination of suction slots and transducers mounted within tributary ducts somewhat farther back on the airfoil. Precise placement of transducer arrays and boundary layer control devices will necessarily be dependent upon specific airfoil design characteristics.

In the preferred embodiment the invention is used on aircraft during high speed, high altitude cruise. This is the flight regime in which the aircraft normally spends the greatest amount of time and expends the greatest amount of fuel, hence the regime in which the greatest energy savings can be obtained. It is anticipated that the invention will also result in energy savings in other flight regimes such as holding or takeoff and landing, although the presence and use of other techniques and devices, previously described, reduces the incremental benefit that might otherwise be obtained by the use of the invention in those flight regimes.

Whereas a preferred embodiment of the invention has been described in detail, it should be apparent that many modifications and variations thereto are possible, all of which fall within the true spirit and scope of the invention.

I claim:

1. A method for retarding the onset of turbulent boundary layer flow around an airfoil moving with respect to an air mass through the infusion of acoustic energy into the boundary layer comprising the steps of:
   (a) electronically generating acoustic energy at or near the surface of an airfoil moving through an air mass and having a laminar flow boundary layer over at least a portion of said surface of said airfoil,
   (b) providing a plurality of predetermined acoustic energy emitting locations upon said airflow surface over which said boundary layer flow is laminar, and
   (c) directing said electronically generated acoustic energy into said boundary layer from said plurality of predetermined acoustic energy emitting locations,
      wherein the step of electronically generating includes generating said acoustic energy as a band of random noise having wavelengths not greater than one half of a predetermined critical wavelength of Tollmien-Schlichting oscillatory disturbance waves present within said boundary layer in the absence of said generated acoustic energy, such that said band of random noise forms wave patterns that destructively interfere with the formation of said Tollmien-Schlichting oscillatory disturbance waves.

2. The method for retarding the onset of turbulent boundary layer flow around a moving airfoil as set forth in claim 1, in which step (b) comprises the step of:
providing said plurality of locations from which electronically generated acoustic energy is emitted into said boundary layer as an array extending spanwise and cordwise upon said airfoil surface, and in which those locations nearest the leading edge of said airfoil are situated, with respect to the direction of flow of said boundary layer, adjacent to that portion of said boundary layer that is slightly upstream of the point at which laminar flow would become transient in the absence of said generated acoustic energy.

3. The method for retarding the onset of turbulent boundary layer flow around a moving airfoil as set forth in claim 1, including the further step of maintaining laminar boundary layer flow over said airfoil surface by removing that portion of said boundary layer closest to said airfoil surface through apertures in said airfoil surface by the use of suction.

4. The method for retarding the onset of turbulent boundary layer flow around a moving airfoil as set forth in claim 1, including the further step of maintaining laminar boundary layer flow over said airfoil surface by removing that portion of said boundary layer closest to said airfoil surface through apertures in said airfoil surface by the use of suction.

5. The method for retarding the onset of turbulent boundary layer flow around a moving airfoil as set forth in claim 2, including the further step of maintaining laminar boundary layer flow over said airfoil surface by removing that portion of said boundary layer closest to said airfoil surface through apertures in said airfoil surface by the use of suction.

6. Apparatus for retarding the onset of turbulent boundary layer flow around an airfoil moving with respect to an air mass through the infusion of acoustic energy into the boundary layer comprising:
an airfoil moving with respect to an air mass and having laminar boundary layer flow over at least a portion of said airfoil,
a plurality of electro-acoustic transducers, each said transducer having a sound radiating element for generating acoustic energy in a frequency band having wavelengths not greater than one half of the predetermined critical wavelengths of Tollmien-Schlichting disturbance waves present within said boundary layer in the absence of said generated acoustic energy,
means for mounting said electro-acoustic transducer upon the inner side of the surface of said airfoil, such that said sound radiating elements are in acoustic communication with at least a portion of said laminar flow boundary layer,
sound generator means for generating an electrical signal for said electro-acoustic transducers,
and circuitry means for connecting said plurality of electro-acoustic transducers to said sound generator means.

7. Apparatus for retarding the onset of turbulent boundary layer flow around an airfoil moving with respect to an air mass, as set forth in claim 6, in which
portions of said airfoil surface comprise acoustically pervious material, and
said mounting means position said sound radiating elements of said electro-acoustic transducers adjacent said acoustically pervious portions of said airfoil surface, such that acoustic energy emitted from said radiating elements is directed through said acoustically pervious portions into said boundary layer from an aerodynamically smooth airfoil surface.

8. Apparatus for retarding the onset of turbulent boundary layer flow around an airfoil moving with respect to an air mass, as set forth in claim 7, in which said circuitry means further comprises
band pass filter means for filtering said electrical signal from said sound generator means so as to create the frequency band having wavelengths not greater than one half of predetermined critical wavelengths of Tollmien-Schlichting disturbance waves present within said boundary layer in the absence of said generated acoustic energy, amplifier means for amplifying said electrical signal from said band pass filter means, and
connector means for providing electrical connections between said electro-acoustic transducers, said sound generator means, said band pass filter means, and said amplifier means.

9. Apparatus for retarding the onset of turbulent boundary layer flow around an airfoil moving with respect to an air mass, as set forth in claim 6, further comprising:
an air suction source,
a plurality of spanwise air ducts, each said duct being mounted against the inner surface of said airfoil such that said inner surface constitutes a portion of the inner wall of said duct, and having one closed end and one open end adapted to be coupled to said air suction source,
a plurality of tributary air ducts,
each said tributary duct having two closed ends and being mounted within one of said spanwise air ducts and against the inner surface of said airfoil such that said inner surface constitutes a portion of the inner wall of said tributary duct,
said airfoil inner surface portion of said tributary ducts containing apertures through said airfoil surface such that boundary layer air adjacent said apertures is caused to be drawn into said tributary ducts when suction is applied, thence through said perforations in said tributary ducts into said spanwise ducts and thence to said air suction source,
a plurality of electro-acoustic transducers mounted to said tributary ducts within said spanwise ducts and having sound radiation elements proximally situated within said tributary ducts so as to cause said acoustic energy to be radiated and diffused within said tributary ducts and reradiated through said apertures in said airfoil surface into said boundary layer passing immediately adjacent said apertures.

10. Apparatus for retarding the onset of turbulent boundary layer flow around an airfoil moving with respect to an air mass, as set forth in claim 7, further comprising:
an air suction source,
a plurality of spanwise air ducts, each said duct being mounted against the inner surface of said airfoil such that said inner surface constitutes a portion of the inner wall of said duct, and having one closed end and one open end adapted to be coupled to said air suction source, a plurality of tributary air ducts, each said tributary duct having two closed ends and being counted mounted one of said spanwise air ducts and against the inner surface of said airfoil such that said inner surface constitutes a portion of the inner wall of said tributary duct, said airfoil inner surface portion of said tributary duct containing apertures through said airflow surface such that boundary layer air adjacent said apertures is caused to be drawn into said tributary ducts when suction is applied, thence through said perforations in said tributary ducts into said spanwise ducts and thence to said air suction source, a plurality of electro-acoustic transducers mounted to said tributary ducts within said spanwise ducts and having sound radiation elements proximally situated within said tributary ducts so as to cause said acoustic energy to be radiated and diffused within said tributary ducts and reradiated through said apertures in said airfoil surface into said boundary layer passing immediately adjacent said apertures.

11. Apparatus for retarding the onset of turbulent boundary layer flow around an airfoil moving with respect to an air mass, as set forth in claim 8, further comprising:

an air suction source, a plurality of spanwise air ducts, each said duct being mounted against the inner surface of said airfoil such that said inner surface constitutes a portion of the inner wall of said duct, and having one closed end and one open end adapted to be coupled to said air suction source, a plurality of tributary air ducts, each said tributary duct having two closed ends and being mounted within one of said spanwise air ducts and against the inner surface of said airfoil such that said inner surface constitutes a portion of the inner wall of said tributary duct, said airfoil inner surface portion of said tributary ducts containing apertures through said airfoil surface such that boundary layer air adjacent said apertures is caused to be drawn into said tributary ducts when suction is applied, thence through said perforations in said tributary ducts into said spanwise ducts and thence to said air suction source, a plurality of electro-acoustic transducers mounted to said tributary ducts within said spanwise ducts and having sound radiation elements proximally situated within said tributary ducts so as to cause said acoustic energy to be radiated and diffused within said tributary ducts and reradiated through said apertures in said airfoil surface into said boundary layer passing immediately adjacent said apertures.

* * * * *